United States Patent [19]
Deck et al.

[11] Patent Number: 5,784,164
[45] Date of Patent: Jul. 21, 1998

[54] METHOD AND APPARATUS FOR AUTOMATICALLY AND SIMULTANEOUSLY DETERMINING BEST FOCUS AND ORIENTATION OF OBJECTS TO BE MEASURED BY BROAD-BAND INTERFEROMETRIC MEANS

[75] Inventors: Leslie L. Deck, Middletown; Stephen H. Chakmakjian, Portland, both of Conn.

[73] Assignee: Zygo Corporation, Middlefield, Conn.

[21] Appl. No.: 822,362

[22] Filed: Mar. 20, 1997

[51] Int. Cl.$^6$ ............................................. G01B 9/02
[52] U.S. Cl. ........................................ 356/359; 250/201.3
[58] Field of Search .................................. 356/357, 358, 356/359; 250/201.3

[56] References Cited

U.S. PATENT DOCUMENTS

| | | |
|---|---|---|
| 3,798,449 | 3/1974 | Reinheimer et al. |
| 4,333,007 | 6/1982 | Langlais et al. |
| 4,340,306 | 7/1982 | Balasubramanian |
| 4,447,717 | 5/1984 | Nohda |
| 4,577,095 | 3/1986 | Watanabe |
| 4,600,832 | 7/1986 | Grund |
| 4,625,103 | 11/1986 | Kitamura et al. |
| 4,661,692 | 4/1987 | Kawasaki |
| 4,687,913 | 8/1987 | Chaban |
| 4,818,110 | 4/1989 | Davidson |
| 4,931,630 | 6/1990 | Cohen et al. .............. 250/201.3 |
| 5,112,129 | 5/1992 | Davidson et al. |
| 5,122,648 | 6/1992 | Cohen et al. .............. 356/359 |
| 5,208,451 | 5/1993 | Deck ........................ 356/356 |
| 5,398,113 | 3/1995 | de Groot |
| 5,402,234 | 3/1995 | Deck |
| 5,589,938 | 12/1996 | Deck ........................ 356/359 |

OTHER PUBLICATIONS

J.F. Biegen and R.A. Smythe, "High Resolution Phase Measuring Laser Interferometric Microscope for Engineering Surface Metrology," SPIE vol. 897, Scanning Microscopy Technologies and Applications (1988), pp. 207–216.

Edward H. Hellen and Daniel Axelrod, "An Automatic Focus/Hold System for Optical Microscopes," Rev. Sci. Instrum. 61 (12), Dec. 1990, pp. 3722–3725.

Donald K. Cohen, et al., "Automatic Focus Control: The Astigmatic Lens Approach," Applid Optics, vol. 23, No. 4, Feb. 15, 1984, pp. 565–570.

Paul James Caber, "The Use of Digital Signal Processing Techniques for the Interferometric Profiling of Rough Surfaces," University of Arizona, Department of Electrical Engineering, 1991, pp. 1–87.

*Primary Examiner*—Samuel A. Turner
*Attorney, Agent, or Firm*—Bryan Cave LLP

[57] ABSTRACT

A method and improved system for automatically and substantially simultaneously focusing and orienting an interferometric optical system, such as an interferometric microscope (25) illuminated by broad-band light, with regard to a surface under test (66), for providing a best focus and orientation of objects to be measured. The optical system (20, 25, 30, 35, 37, 60, 40) includes a pixel array, such as a sparse array (30) onto which an interferogram is imaged. The pixel array (30) is scanned (20, 25) for detecting a peak fringe contrast for the pixels in the array (30) and the scan position at the detected peak fringe contrast for each pixel int he array (30) is saved (40). At least a portion, if not all, of the saved scan positions are fitted to a surface shape for providing a plane of best focus for the surface under test (66), and the surface under test (66) is automatically positioned (40, 35, 60) relative to the optical system for automatically focusing the object under test (66) across the plane of best focus.

22 Claims, 1 Drawing Sheet

METHOD AND APPARATUS FOR AUTOMATICALLY AND SIMULTANEOUSLY DETERMINING BEST FOCUS AND ORIENTATION OF OBJECTS TO BE MEASURED BY BROAD-BAND INTERFEROMETRIC MEANS

FIELD OF INVENTION

The invention relates to automatic focusing and orientation systems and methods for microscopes, especially interference microscopes.

PRIOR ART

Interference microscopes are used extensively in the metrology and quantitative characterization of surfaces. Such devices are non-contact instruments of extraordinary precision having typical vertical resolutions near 0.1 nm. In a typical interference microscope, light from a source is split by appropriate means to travel along both a reference and test path. The light in the reference path is focused on a reference surface while the light in the test path is focused on the surface to be measured. Light reflected from the reference and test surfaces interfere to create an interference pattern known as an interferogram. The interferogram is detected by a photosensitive detector array and the resulting signals from the array are analyzed using various well known interferometric techniques to determine the topography of the surface. See, for example, J. F. Biegen et al., "High-resolution phase-measuring laser interferometric microscope for engineering surface metrology," 1 Surface Topography 469 (1988). However, accurate data can only be obtained when the measurement surface is in focus over the full field of view. This generally means that the test surface must be both translated along the optical axis.

Due the presence of interference fringes, it is extremely difficult to use conventional, non-interferometric methods to perform these functions in an interferometric microscope. Prior art methods that utilize "texture algorithms," such as are disclosed in U.S. Pat. Nos. 4,600,832 (Grund), 4,577,095 (Watanabe), 4,447,717 (Nohda) and 4,333,007 (Langlais, et al.), require surface structure that is missing in the highly polished surfaces often measured in precision surface metrology. Other purely focusing techniques are based on optical triangulation principles and are commonly referred to as triangulation methods. These include, among others, the skew beam methods and the well known Foucault knife edge method. See for example, E. H. Hellen and D. Axelrod, "An Automatic Focus/Hold System for Optical Microscopes," 61 Rev. Sci. Inst. 3722 (1990). The use of similar techniques in conventional microscopes is also disclosed in U.S. Pat. Nos. 4,687,913 (Chaben), 3,798,449 (Reinheimer, et al.), 4,661,692 (Kawasaki) and 4,625,103 (Kitamura, et al.). In these methods, a peripheral ray is reflected from the test surface and is then focused at an image plane. As the test surface moves, the longitudinal focus shift of the image is translated into a lateral motion of the ray across the face of a differential detector located at the image plane, and a focus error signal is generated by the detector. These methods enjoy high precision, a large capture range, high-speed operation suitable for fast servo control, and simple architecture. Unfortunately, when used with an interferometric microscope, the presence of interference produces modulation in the focus error signal that destroys the unique signature of focus. Similar interference problems plague a prior art astigmatic approach described by D. Cohen et al., in an article entitled "Automatic Focus Control: the Astigmatic Lens Approach," 23 Applied Optics 565 (1984). A possible prior art way of circumventing this interference problem is disclosed in U.S. Pat. No. 5,208,451 to L. Deck, but the single point nature of these measurements do not provide information about the surface orientation, only about focus position.

Most interferometric microscope systems utilize objectives which contain the interferometer. These objective, typically outfitted with Michelson or Mirau interferometers, are set up so that maximum fringe contrast occurs at the best focus position. A focusing technique which takes advantage of this fact is disclosed in U.S. Pat. Nos. 4,931,630 and 5,122,648, both by Cohen et al. This prior art technique searches for a maximum of the fringe contrast to find focus at one point in the field. The accuracy of this prior art technique is enhanced if broad-band light is used since a broad-band source produces an extremely narrow interference region, typically only a few microns wide. However, this technique, too, is a single point measurement, providing no information on the test surface orientation.

There is accordingly an unsatisfied need, particularly for use in or in association with interferometric microscopes and the like, for an automatic focusing and orientation apparatus and technique that is fast and repeatable and can be utilized for quantitative characterization of the types of surfaces typically encountered or of interest in precision surface metrology.

SUMMARY OF THE INVENTION

The present invention provides an improved system and method for rapidly, automatically and simultaneously focusing and orienting an interferometric optical system with regard to a surface under test. By rapidly scanning one arm of the interferometer parallel to the optical axis while illuminating with broad-band light and imaging the resulting interferogram onto an array detector, each of the detector elements (pixels) will experience peak fringe contrast at the point when the reference and test optical paths are equal, known as the equal path condition. This will occur at different times for different pixels depending on relative test/reference surface topography and orientation with respect to the optical axis. The scan position at peak fringe contrast for each pixel of the array detector are saved. Either all or a pre-selected portion of the saved peak modulation scan positions are fitted to a surface shape, typically a plane, which determines the plane of best focus for the surface under test. The surface under test can then be positioned relative to the optical system and oriented relative to the axis of the optical system so that, for example, it is in focus across the surface.

In one embodiment of the present invention, an interferometric microscope objective is scanned while photo-induced charge from each pixel in the detector array is amplified, digitized and stored in digital memory during the scan. Each complete readout of the detector (a frame) is associated with a particular position in the scan. This can be accomplished with a constant velocity scan and a constant frequency frame rate. Alternatively, synchronous storage of the scan position from an encoder or like position measuring device can be used. A typical scan increment produces a 90 degree fringe shift per frame. After the scan is complete, the stored scan data are analyzed to calculate, for each pixel, the scan position at peak intensity modulation. The array of calculated scan positions is then fit to a surface shape, normally a plane, to determine the position and orientation of the surface with respect to the instrument optical axis.

In a second embodiment of the present invention, a method similar to the first embodiment described above is used, but to reduce the amount of data acquired during the scan, a sparse array is employed. The sparse array has only a small number of pixels compared to a standard imaging array. For example, a 32×32 pixel sparse array contains only 1024 pixels compared to the more than 65,000 pixels from a standard 256×256 imaging array. The pixels in the sparse array are also small and widely separated, i.e. have a small fill factor, so that the full image field is sampled and yet each pixel contains only a fraction of a fringe period even at high fringe densities. This assures significant fringe modulation even when the part is heavily tilted relative to the instrument optical axis.

In a third embodiment of the present invention, a method similar to the first or second embodiment described above is used but to reduce the amount of data acquired during the scan, a method to acquire data only about the modulation peak, as described in commonly assigned U.S. Pat. No. 5,402,234, is employed.

In a fourth embodiment of the present invention, a method similar to the first or second embodiment described above is used but the scan rate is increased so as to produce a 450 degrees or more fringe shift per frame. This sub-Nyquist acquisition increases system throughput by increasing the frame rate and reducing the amount of data that must be analyzed, but measurement precision is degraded.

In a fifth embodiment of the present invention, a method similar to the first or second embodiment described above is used but the photo-induced charge from each pixel in the detector array is amplified and then band-pass filtered. The filtering can be performed in either the analog or digital domain. The pass-band of the band-pass filter is set to the expected fringe modulation frequency, determined from the mean wavelength of the broad-band illumination, the scan rate, and characteristics of the interferometer. The output of the band-pass filter is then sent to a peak detector which produces a signal when the modulation amplitude is greatest. When the peak modulation signal is asserted, the scan position for that pixel is recorded and saved. The array of recorded scan positions is then fit to a surface shape, normally a plane, to determine the position and orientation of the surface with respect to the instrument optical axis.

DETAILED DESCRIPTION OF THE PREFERRED EMBODIMENTS

Figure 1:
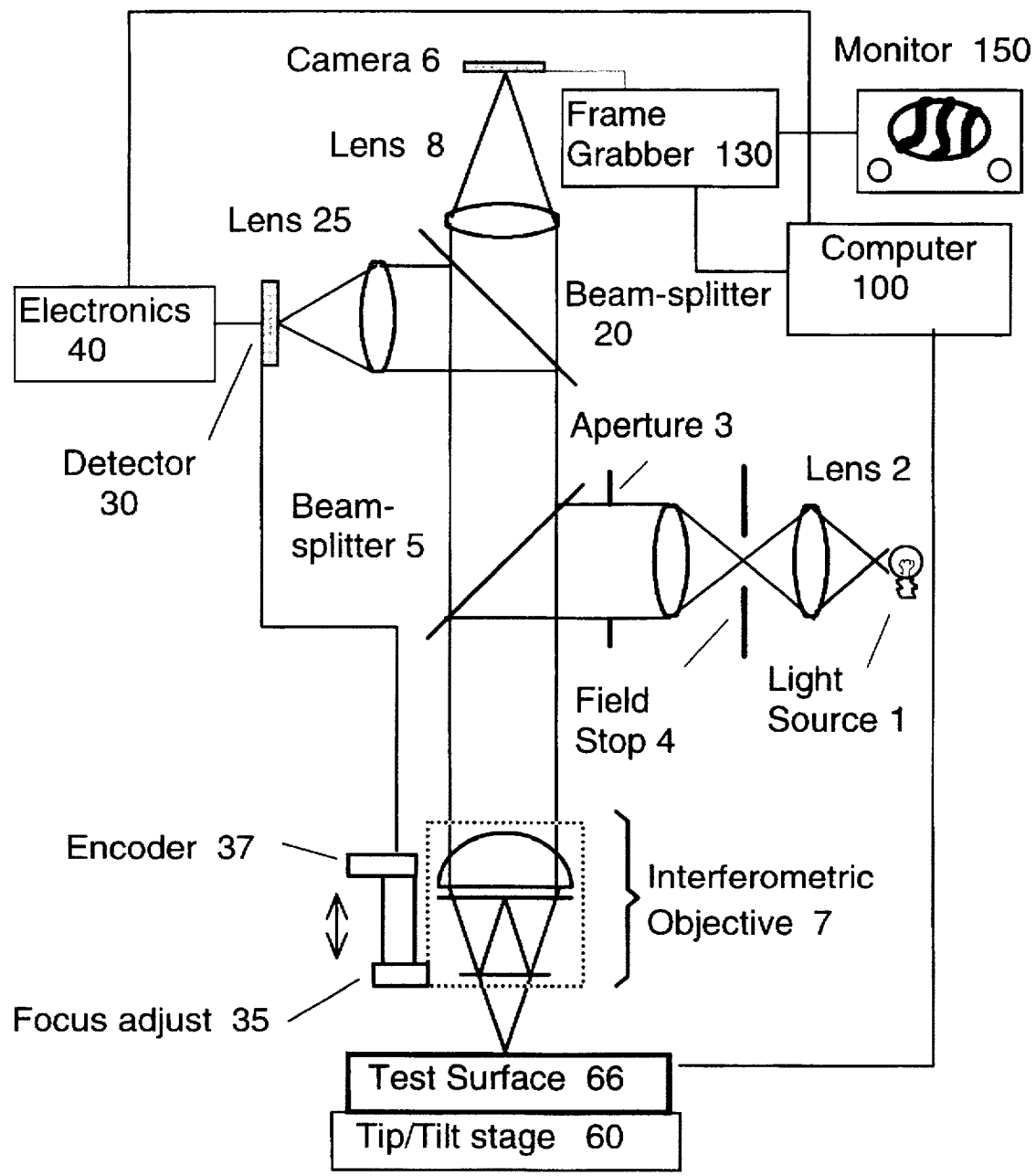
FIG. 1 is a diagrammatic illustration of an improved interferometric microscope optical system in accordance with the present invention capable of carrying out the presently preferred method of the present invention.

Referring now to the drawing in detail, the interferometric microscope optical system shown in FIG. 1 preferably incorporates the usual optical elements for interferometry. These elements include a light source 1, a condenser or collector lens 2, an aperture stop 3, a field stop 4, a beamsplitter 5, an interferometric objective 7, and a focusing lens 8 all of which are well known in the art and, accordingly, may be selected and implemented in any suitable manner as a general matter of design choice. Also preferably included in the system shown in FIG. 1 is a conventional computer 100, frame-grabber 130, monitor 150 and camera 6, all of which conventionally typify an interferometrically based surface metrology tool.

The presently preferred method of the present invention is an automatic focus and orientation technique hereinafter referred to as AFO, which may be practiced with a few principle components of the type illustrated in FIG. 1. The system illustrated in FIG. 1 depicts these principle components incorporated into an interferometric microscope apparatus constructed in accordance with the present invention. These components include the AFO detector 30, a second beamsplitter 20 for directing all or part of the interferogram present in the system towards the AFO detector 30, a separate lens 25, such as typically a conventional microscope objective for imaging the interferogram onto the AFO detector 30, a conventional focus adjustment device 35 with focus adjust encoder 37, a conventional two axis tip/tilt stage 60 to adjust the orientation of a test surface 66, and conventional electronics 40 which preferably controls the operation of the AFO detector 30 and, if desired, analyses the intensity data obtained by the AFO detector 30 to obtain the optimum focus across the test surface 66.

The presently preferred AFO method generally proceeds by commanding the focus adjust to rapidly scan through the expected focus position while the AFO detector electronics 40 acquires and saves sequential intensity data from the AFO detector 30. Preferably, each complete readout of all the pixels in the AFO detector 30, which comprises a frame, occurs during a period such that the axial movement occurring during that period corresponds to nominally ¼ fringe. Preferably, after every such frame, the AFO electronics 40 also interrogates and saves the value of the focus adjust encoder 37. After a predefined scan length has been achieved, the scan is preferably stopped, and the AFO electronics 40 determines the scan position at the peak of the modulation contrast from the saved intensity and scan data using algorithms well known in the art. Alternatively, if desired, the intensity data can be downloaded to the computer 100 for analysis. In this way, it is a simple matter to analyze the data while accounting for conditions that are specific to the application, such as, for example, ignoring data from certain uninteresting regions. The resulting 2-dimensional map of scan positions (one for each pixel) is preferably fit to a surface shape, preferably a best fit plane, and the focus adjust 35 and tip/tilt stage 60 are adjusted to orient the test surface 66 onto that best fit plane.

In order to maximize AFO throughput or ease of use, or as a general matter of design choice, variations to the presently preferred AFO method and to the principle components described above can be made without departing from the spirit and scope of the present invention. For example, the beamsplitter 20 can be a flip-in mirror so as to supply as much light energy to the AFO detector 30 as possible.

The lens 25 is preferably an optic with a high degree of color correction and with a focal length chosen to map the full field onto the AFO detector 30, such as a microscope objective which has such qualities and thus, is preferably used.

The AFO detector 30 is preferably a conventional sparse 2-dimensional CCD array. In this context, sparse means a small number of widely separated pixels. A small number of pixels reduces the amount of data storage and allows the AFO detector 30 to be read-out quickly for increased throughput. Such a sparse array may be constructed, by way of example, from a commercially available large element, low density array in which a mask has been placed over the active array surface having apertures of the desired size and spacing to create an effective sparse sampling array.

If desired, focus adjust encoder 37 can be removed if the scan rate of focus adjust element 35 is a fixed constant and a fixed AFO detector 30 frame rate is applied. In this instance, the scan increment for each AFO detector 30 frame period is constant and the scan position can then be determined by the frame number without the need for an encoder 37.

The scan increment may also be changed as a matter of design choice taking into account that a smaller increment provides more accurate peak modulation determination but requires more memory and slower scan speeds for constant scan lengths and frame rates, while a larger increment implies less memory and faster scan speeds at the cost of peak modulation resolution.

After the scan is complete, the stored intensity data from the AFO detector 30 is preferably analyzed for the scan position where a particular feature of the intensity is located. Typically the feature sought is preferably the intensity contrast peak. The determination of the contrast peak can be performed in a variety of ways. The intensity contrast $M_i$ for each pixel at each frame i can be calculated using conventional methods such as described in U.S. Pat. No. 4,340,306 (Balasubramanian) and U.S. Pat. Nos. 4,818,110 and 5,112,129 both to Davidson. A systematic search for the maximum value of $M_i$ then determines the frame position, and thereby scan position, of maximum contrast. Alternatively, the intensity data from the AFO detector 30 can be analyzed in the frequency domain for a different feature, the point of stationary phase, using by way of example, the conventional method described in U.S. Pat. No. 5,398,113 to de Groot. To reduce the amount of required storage or analysis time, preferably preprocessing of the intensity data from the AFO detector 30 can be employed. A conventional fast acquisition algorithm like that disclosed in U.S. Pat. No. 5,402,234 to L. Deck may be employed, wherein a discriminator is described that is a measure of the intensity contrast. During the course of the acquisition, the described method automatically saves the frame number (or scan position) corresponding to the peak discriminator. This form of acquisition can significantly reduce the total amount of required memory. As a further example of a preprocessing alternative useful with the presently preferred method of the present invention, see, for example, P. J. Caber, "The use of digital signal processing techniques for the interferometric profiling of rough surfaces," Masters Thesis in Electrical Engineering, University of Arizona (1991), which describes a method in which a photo-induced charge from each pixel in the detector array is amplified and then band-pass filtered. The filtering can be performed in either the analog or digital domain. The pass-band of the band-pass filter is set to the expected fringe modulation frequency, determined from the mean wavelength of the broad-band illumination, the scan rate and characteristics of the interferometer. The output of the band-pass filter is then sent to a peak detector which produces a signal when the modulation amplitude is greatest. When the peak modulation signal is asserted, the scan position for that pixel is recorded and saved. Irrespective of the method by which the array of scan positions at the desired intensity feature is arrived at, this array is then fit to the surface, typically a plane, using by way of example, a least-squares approach. The coefficients describing the best fit surface are then used to determine the positions of the focus adjust stage 35 and tip/tilt stage 60 necessary to bring the interesting parts of the test surface 66 into focus.

In the presently preferred embodiment, the AFO electronics 40 supports the AFO detector 30 and contains sufficient digital memory means to store digitized intensity measurements for all the frames from the AFO detector 30 during the scan, as well as scan position information at each frame. The presently preferred method of the present invention sends this data to the host computer 100 for analysis after the scan is complete. The main reason for this is flexibility in processing. The host computer 100 is typically the repository of all information regarding the particular measurement and, as such, can easily account for conditions that are specific to the application. For example, because of a finite depth of focus, it may be impossible to bring all regions of a test surface 66 consisting of a number of raised plateaus at different heights simultaneously into focus. The host computer 100 can then concentrate on bringing into focus those areas of specific interest and ignore data from mother uninteresting regions. Another advantage of the presently preferred method of the present invention is that it conforms well with a typical instrument system architecture, whereby for reasons of ergonomics and ease of automation, the tip/tilt staging 60 and focus staging 35 is under host computer 100 control. However, if desired, the processing elements necessary to perform some or all of the analysis could be contained in the AFO electronics 40. This has the advantage of increased throughput since the data does not have to be transmitted to a processing center.

A short coherence light source as used herein is meant to include a broad band light source or a spatially extended light source such that it enables localized fringes to occur near the equal path condition of the interferometer.

It is to be understood that as all of these choices provide substantially the same functionality, they may be made by those skilled in the art without departing from the spirit and scope of the present invention.

What is claimed is:

1. A method for automatically and substantially simultaneously focusing and orienting an interferometric optical system with regard to a surface under test, said optical system comprising a short coherence light source for illuminating said optical system, a pixel array onto which an interferogram may be imaged, and means for scanning said interferometer through a zero optical path difference condition, said method comprising the steps of:

detecting a peak fringe contrast for said pixels in said array;

saving a scan position at said detected peak fringe contrast for said pixels in said array;

fitting at least a portion of said saved scan positions to a surface shape for providing a plane of best focus for said surface under test; and positioning said surface under test relative to said optical system for focusing said object under test across said plane of best focus.

2. A method in accordance with claim 1 further comprising the step of illuminating said optical system with broadband light.

3. A method in accordance with claim 2 further comprising the steps of rapidly scanning an arm of said interferometric optical system parallel to an optical axis of said optical system while illuminating said system with said broad-band light.

4. A method in accordance with claim 3 wherein all of said pixels in said pixel array experiences such peak fringe contrast at a point when an equal path condition is present.

5. A method in accordance with claim 4 wherein said peak fringe contrast occurs for at least three non-colinear pixels in said pixel array.

6. A method in accordance with claim 1 wherein all of the saved scan positions are fitted to said surface shape.

7. A method in accordance with claim 1 wherein said optical system comprises an interferometric microscope.

8. A method in accordance with claim 7 wherein said interferometric microscope comprises an interferometric objective means, said scanning step comprising the step of scanning said interferometric objective means.

9. A method in accordance with claim 8 wherein said pixels in said array provide a photo induced charge capable of being amplified and stored during said scan, said scanning step further comprising the step of scanning said objective means while said photo induced charge from each pixel in said array is amplified and stored during said scan, each frame being associated with a particular position in said scan.

10. A method in accordance with claim 9 comprising the step of scanning said objective means with a constant velocity scan and constant frequency frame rate.

11. A method in accordance with claim 9 comprising the step of synchronously storing said scan position.

12. A method in accordance with claim 1 wherein said pixel array comprises a sparse array in which said pixels are small and widely separated and have a small fill factor.

13. A method in accordance with claim 1 wherein said scan position is acquired only about a modulation peak for said pixel.

14. A method in accordance with claim 1 wherein said scanning step comprises the step of scanning said pixel array at a scan rate sufficient to produce at least a 450 degree fringe shift per frame for enabling a sub-Nyquist acquisition for increasing system throughput.

15. A method in accordance with claim 1 wherein each of said pixels provides a photo induced charge, said method further comprising the steps of amplifying and band pass filtering said photo induced charges for providing said scan position.

16. A method in accordance with claim 15 further comprising the step of illuminating said optical system with broad-band light.

17. A method in accordance with claim 16 wherein said band pass filtering step comprises the step of setting the pass band to an expected fringe modulation frequency, said expected fringe modulation frequency being dependent on a mean wavelength of said broad-band light.

18. A method in accordance with claim 17 wherein said detecting step comprises the step of producing a peak modulation signal when the modulation amplitude is greatest, said scan position saving step comprising the step of saving said scan position for said pixel in response to production of said peak modulation signal for said pixel.

19. In an interferometric optical system having an optical axis and a detector comprising a plurality of pixels onto which an interferogram may be imaged, a short coherence light source for illuminating said optical system, means for scanning said interferometer through a zero optical path difference condition, and a means for focusing and orienting said interferometric optical system with regard to a surface under test; the improvement comprising:

means for detecting a peak fringe contrast for said pixels in said array;

means operatively connected to said pixel array for saving a scan position at said detected peak fringe contrast for said pixels in said array;

means for fitting at least a portion of said saved scan position to a surface shape for providing a plane of best focus for said surface under test; and means operatively connected between said fitting means and said focusing and orienting means for automatically positioning said surface under test relative to said optical system by automatically focusing said object under test across said fitted plane of best focus; whereby said optical system may be automatically and simultaneously best focused and oriented with regard to said surface under test.

20. An improved system in accordance with claim 19 wherein said short coherence light source comprises means for illuminating said optical system with broad-band light.

21. An improved system in accordance with claim 20 wherein said optical system comprises an interferometric microscope means.

22. An improved system in accordance with claim 21 wherein said interferometric microscope means comprises an interometric bjective lens means, said scanning means comprising means for scanning said interferometric objective lens means.

* * * * *